Feb. 6, 1951          N. STEVENS          2,540,145
TOGGLE HEAD BOLT FOR HOLE SEALING DEVICES
Filed July 26, 1945
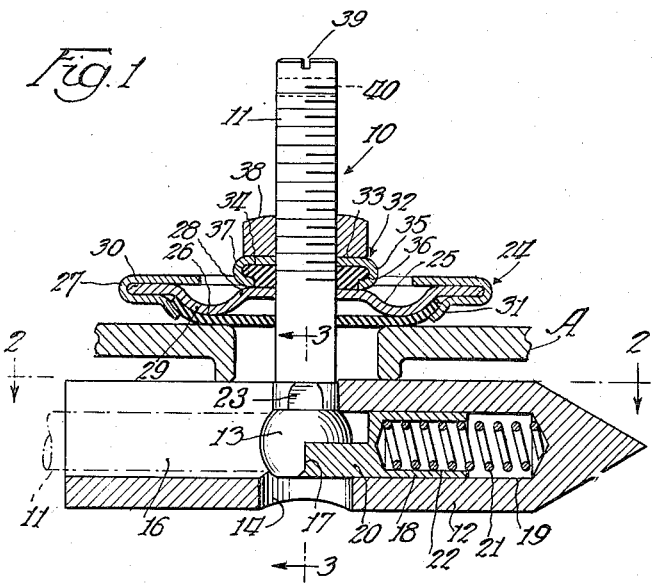
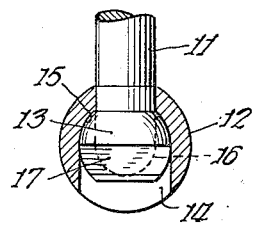
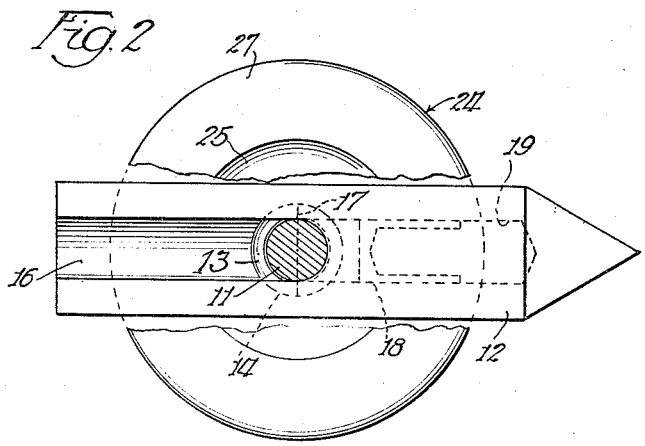
Inventor
Nichols Stevens
By: Charles O. Shervey
Atty.

Patented Feb. 6, 1951

2,540,145

UNITED STATES PATENT OFFICE 2,540,145

TOGGLE HEAD BOLT FOR HOLE SEALING DEVICES

Nichols Stevens, Chicago, Ill.

Application July 26, 1945, Serial No. 607,165

4 Claims. (Cl. 85—3)

This invention relates to hole sealing devices adapted for closing and sealing holes in tanks, boilers and casings and the like. Sometimes the wall of a tank, boiler or casing bursts, causing a leak through which water, steam or gas may escape, making the tank, boiler or casing useless until the leak is stopped.

One of the objects of the present invention is to provide a hole sealing device which can be quickly and easily applied to tanks, boilers, casings and the like.

Another object is to provide a hole sealing device in the form of a toggle bolt, of which the toggle may be thrust through the hole in the wall and will automatically position itself parallel with the wall.

Another object is to provide novel washers to surround the stem of the bolt with one washer covering the hole in the wall and bearing against the wall adjacent the hole, the other washer functioning to prevent the contents of the tank, boiler or other object on which the device is used from leaking out past the screw threads of the bolt. A nut is threaded on the bolt and when screwed up tight, it firmly presses the one washer against the wall and effectively stops any leak through the hole.

With these and other objects in view, this invention consists in the several novel features hereinafter fully set forth and more particularly defined in the claims.

This application is a continuation in part of my pending application, Serial No. 547,963, filed August 3, 1944.

The invention is clearly illustrated in the drawing accompanying this specification, in which:

Fig. 1 is a central vertical section through a hole sealing device embodying a simple form of the invention, showing the same applied to a fragment of a boiler wall;

Fig. 2 is a view partly in plan and partly in horizontal section with the main washer partly broken away, the line of section being indicated at 2—2 in Fig. 1; and Fig. 3 is a vertical cross section taken on the line 3—3 of Fig. 1.

Referring to said drawing, which is illustrative of one embodiment of the invention, the reference character 10 designates a toggle bolt of which 11 designates the bolt and 12 the toggle, here shown as pointed at one end, although this is not essential to the invention broadly considered.

The bolt is screw threaded for a portion of the length and one end is formed with a spherical head 13 which is seated in a socket 14, one wall 15 of which is spherical to seat against the spherical head 13. A groove 16 is formed in the side of the toggle through which the stem of the bolt extends, said groove being wide enough for the stem of the bolt to be swung into it, but of less width than the diameter of the spherical head of the bolt.

The spherical head and socket provide a ball and socket like connection between the bolt and toggle, thereby eliminating any screw, rivet or other pivotal connection between them.

The stem is flattened as at 23 to engage the side faces of the groove to thereby prevent relative rotation between the bolt and toggle on the axis of the bolt.

The lower end of the head of the bolt is cut back to form a shoulder 17, against which is spring pressed a hollow pin 18 slidably mounted in a socket 19 formed in the toggle and extending parallel with its axis. On the end of the pin 18, which engages the shoulder 17 of the bolt, is a projection 20 which is yieldably held in engagement with the shoulder 17 by a coiled compression spring 21 contained in a bore 22 in the pin and seated against the bottom of said bore and the bottom of the socket 19. Whenever the stem of the bolt is swung into the groove in the toggle the shoulder 17 presses the pin 18 back against the tension of the spring 21, and when the stem is released the spring swings the bolt into a position at right angles to the toggle.

Surrounding the stem of the bolt is a composite washer 24 comprising a metal disc 25 of dished formation and a disc like rubber washer 26 held on the disc 25 by a grooved ring 27. The disc 25 is dished upwardly as at 28 and downwardly as at 29, terminating in a rim 30. The grooved ring embraces the rim and is formed with a downturned flange 31 which cooperates with the disc to grip the edge of the washer and hold it in place. The upper web of the grooved ring is extended radially inwardly and cooperates with the disc to grip the edge of the rubber washer when it is applied to the upper side of the disc. It is to be understood that the rubber washer may be used on either side of the disc, depending on the character of the hole which is to be sealed. The rubber washer is shown as secured to the underside of the disc as viewed in Fig. 1. The disc and rubber washer are centrally apertured to receive the stem of the bolt.

Resting upon the composite washer 24 is a second composite washer 32 composed of a metal backing 33 and a rubber washer 34. The margin of the metal backing 33 is folded under as at 35 to form an annular groove 36 in which is held the marginal edge 37 of the washer 34, the body portion of which projects through the opening defined by the edge of the inturned edge portion of the backing. The backing and rubber washer are centrally apertured for the reception of the stem of the bolt.

A nut 38 is threaded on the threaded stem of the bolt and is adapted to bear upon the composite washer 32. A kerf 39 may be formed in the end of the stem whereby a screw driver may be applied thereto in case it should become necessary to turn the toggle bolt after the toggle has been inserted through the hole in the wall of a tank, and a hole 40 may be provided in the end portion of the stem in alignment with the toggle so that the user may determine the direction of location of the toggle when contained within a tank or other object.

In applying the device to a tank, boiler or other object having a hole in its wall A which is required to be closed and sealed, the toggle is inserted through the hole—forcibly if necessary, with the stem of the bolt received in the groove of the toggle. When the toggle has been completely inserted, the spring 21 forces the projection of the pin 18 against the shouldered end of the bolt and swings the toggle into a position at right angles to the bolt. The nut 38 is then screwed up tight, thereby pressing the rubber washer of the composite washer 24 against the wall A, around the hole therein, at the same time the composite washer 32 is slightly flattened, thereby making a tight joint between the two composite washers and at the same time the body of the rubber washer 34 is pressed radially inwardly against the screw threads of the stem, thereby making a tight joint therewith and preventing any leak along said screw threads.

Having thus described my invention, it is obvious that various immaterial modifications may be made in the same without departing from the spirit of my invention; hence, I do not wish to be understood as limiting myself to the exact form, construction, arrangement and combination of parts herein shown and described or uses mentioned.

What I claim as new and desire to secure by Letters Patent is:

1. In an attaching device, the combination of an elongated body member having a groove and sockets formed therein, a threaded attaching stem pivotally carried by said body member, said stem having a flattened portion complementally formed to the groove to prevent rotation of the stem to the elongated body member, said stem terminating at one end in a substantially spherical head engaging one of said sockets, said spherical head having a shoulder thereon positioned in said socket, a hollow pin formed with a projection and positioned in another of said sockets, said projection engageable with said shoulder for yieldably maintaining said member and stem in a predetermined relative position, and spring means in said last-mentioned socket and operatively mounted within said hollow pin for urging said hollow pin into engagement with said stem.

2. In an attaching device, the combination of an elongated body member having a plurality of sockets therein and a groove in one side thereof communicating with said sockets, a threaded attaching stem having a spherical head and pivotally carried by said body member with the spherical head thereof located in one of said sockets forming a ball and socket joint, said stem having a flattened portion complementally formed to the groove to prevent rotation of the stem to the elongated body member, said stem being swingable into said groove and having a shoulder positioned in said socket, a pin having a projection complementally formed to the shoulder, positioned in another of said sockets, and engageable with said shoulder for yieldably maintaining said member and stem at right angles to each other, and spring means in said last-mentioned socket for urging the projection of said pin into engagement with the shoulder of said stem.

3. In an attaching device, the combination of an elongated body member having an axial bore therein and a groove in one side thereof communicating with said bore, a threaded attaching stem of smaller diameter than the width of said groove, and terminating at one end in an enlarged substantially spherical head, said head having a notch therein to form a shoulder, said member having a transversely extending bore therein communicating with said axial bore and said groove and of a size to receive said head, the latter being larger than said groove, said stem being adapted to be positioned in said groove with said head in said transverse bore, a pin positioned in said axial bore and engageable with said shoulder for yieldably maintaining said member and stem at right angles to each other, and a compression spring in said axial bore engageable with said pin for urging the latter into engagement with said head.

4. In an attaching device, the combination of an elongated body member, being pointed at one end, having an axial bore therein and a longitudinally extending groove in one side thereof communicating with said bore, a threaded attaching stem of smaller diameter than the width of said groove, and terminating at one end in an enlarged substantially spherical head, said head having a notch therein to form a shoulder, said member having a transversely extending bore therein communicating with said axial bore and said groove and of a size to receive said head, the latter being larger than said groove, said stem being adapted to be positioned in said groove with said head in said transverse bore, a pin positioned in said axial bore and engageable with said shoulder for yieldably maintaining said member and stem at right angles to each other, and a compression spring in said axial bore adjacent the pointed end and engageable with said pin for urging the latter into engagement with said head.

NICHOLS STEVENS.

REFERENCES CITED

The following references are of record in the file of this patent:

UNITED STATES PATENTS

| Number | Name | Date |
| --- | --- | --- |
| 231,334 | Kraus | Aug. 17, 1880 |
| 677,639 | Clapham | July 2, 1901 |
| 1,194,902 | Urban | Aug. 15, 1916 |
| 1,396,278 | Paine et al. | Nov. 8, 1921 |
| 1,841,563 | Williams | Jan. 19, 1932 |
| 2,124,658 | Smith | July 26, 1938 |